Figure 3:
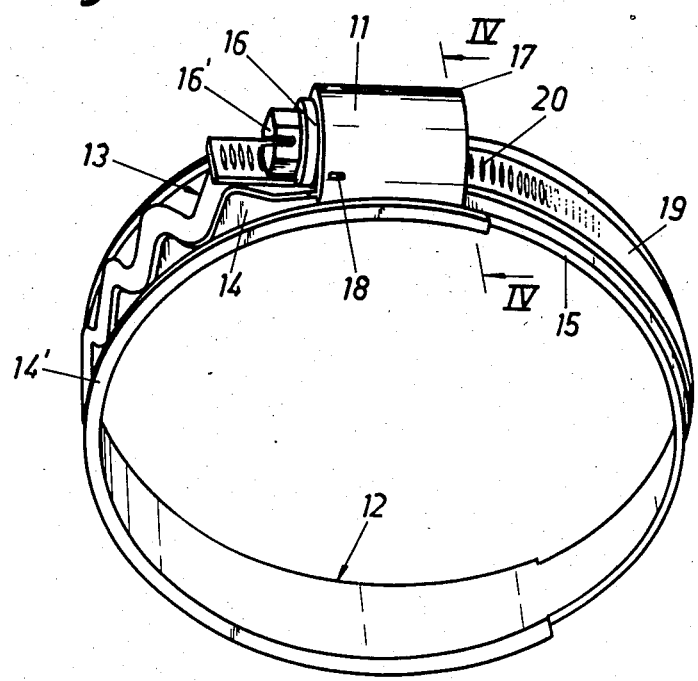

United States Patent [19]

Ribrant

[11] Patent Number: 4,638,531
[45] Date of Patent: Jan. 27, 1987

[54] HOSE CLAMP
[75] Inventor: Sven Ribrant, Färjestaden, Sweden
[73] Assignee: Allmanna Brandreskapsaffaren AB, Stockholm, Sweden
[21] Appl. No.: 779,776
[22] PCT Filed: Jan. 29, 1985
[86] PCT No.: PCT/SE85/00034
§ 371 Date: Sep. 20, 1985
§ 102(e) Date: Sep. 20, 1985
[87] PCT Pub. No.: WO85/03336
PCT Pub. Date: Aug. 1, 1985

[30] Foreign Application Priority Data
Jan. 30, 1984 [SE] Sweden ................ 8400435

[51] Int. Cl.⁴ .................................. B65D 63/02
[52] U.S. Cl. .................. 24/274 R; 24/20 CW; 24/279; 24/283
[58] Field of Search ........... 24/274 R, 274 WB, 278, 24/279, 280, 282, 283, 20 R, 20 CW, 20 W, 20 EE, 20 TT

[56] References Cited
U.S. PATENT DOCUMENTS

| | | | |
|---|---|---|---|
| 492,855 | 3/1893 | Weidaw | 24/283 |
| 1,705,895 | 3/1929 | Blair | 24/20 CW |
| 1,947,715 | 2/1934 | Heuer | 24/283 |
| 3,398,440 | 8/1968 | Bergstrom | 24/274 R |
| 3,924,308 | 12/1975 | Duprez | 24/274 R |
| 4,024,609 | 5/1977 | Haynes | 24/274 R |
| 4,308,648 | 1/1982 | Fay | 24/274 R |

FOREIGN PATENT DOCUMENTS

| | | | |
|---|---|---|---|
| 2227177 | 1/1974 | Fed. Rep. of Germany | 24/274 R |
| 1188207 | 9/1959 | France | 24/283 |
| 1543373 | 10/1968 | France | 283/ |

Primary Examiner—Victor N. Sakran
Attorney, Agent, or Firm—Harness, Dickey & Pierce

[57] ABSTRACT

An improved hose clamp of the kind comprising a tightening band which is bent to annular shape and which has end portions one of which is provided with transverse grooves. In the latter engage the threads of a screw worm which is rotatably journalled in a sleeve enclosing the screw worm but axially non-slidable therein. Said sleeve is formed with a space allowing the threaded band end portion to be moved out of the sleeve upon rotation therein of the screw worm. The opposite band end portion which is attached to the sleeve is elastic in its lengthwise direction and encloses a pressure strap which is bent to annular shape with its end portions overlapping. This pressure strap is arranged to form a guide means to the screw worm sleeve and to the tightening band between said sleeve and said band and an enclosed article. The tightening band describes an arcuate line in the plane of the external face of the pressure strap along the major portion of the circumference of the latter.

4 Claims, 4 Drawing Figures

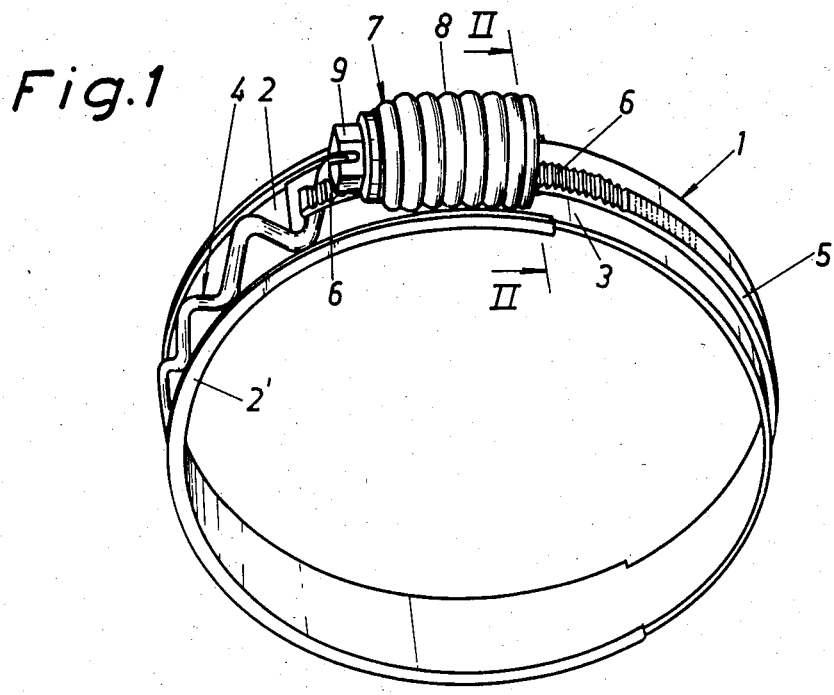
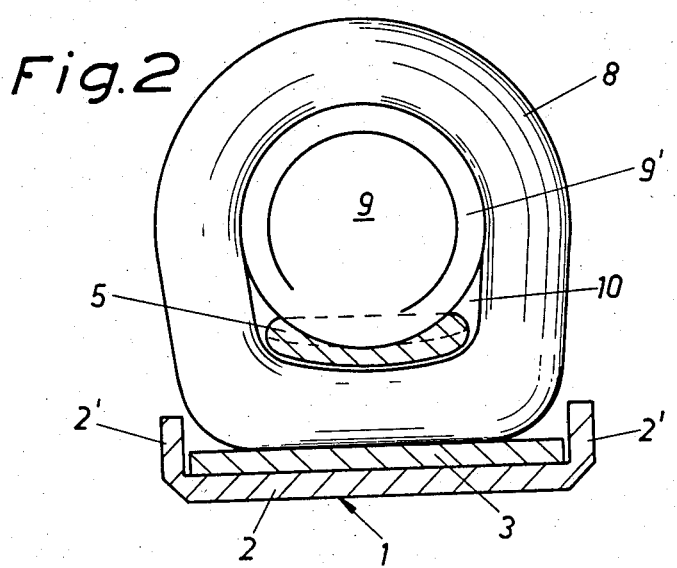

HOSE CLAMP

The subject invention concerns an improved hose clamp of the kind comprising a strip of material which is bent to annular shape to form a tightening band. One end portion of the band is provided with transverse grooves in which engage the threads of a screw worm which is rotatably journalled in a sleeve but axially non-slidable therein. The sleeve encloses the screw worm and is formed with a space allowing the threaded band end portion to be moved out of the sleeve upon rotation of the screw worm therein. The opposite band end portion is fixed to the sleeve.

In prior-art hose clamps of the kind referred to above some leakage is sometimes found. Often the cause of such leakage is ageing of the material of the hose which is mounted by means of a hose clamp so that after some time of use the hose material loses its pliability and elasticity. After a certain period it is therefore necessary to re-tighten the hose clamp and eventually the hose must be exchanged. However, it this is done incorrectly accidents or damage may occur. The problem is particularly common in the engine space in cars, where several hoses are fastened with the aid of hose clamps and where the environment causes considerable problems on account of the large variations in temperatures and of the presence of various liquids, such as petrol, oil, hydraulic fluids, glycol, alcohols and water. Furthermore, vibrations and oscillations of varying frequencies also contribute to the generation of leakage.

One way of counter-acting the generation of leakage in hoses mounted by means of hose clamps is to increase the clamping action of the clamp by tightening the screw worm very hard. Clamp hose manufacturers have endeavoured for many years to produce stronger and more efficient hose clamps. However, when a hose clamp is tightened hard it is inevitable that the clamp bites increasingly deeper into the hose material, which together with the vibrations and the tensile stress to which the material is exposed is liable to cause cracks in the hose material adjacent the clamp. The result is yet another problem.

A more efficient method of obviating the ageing problems found in hose material in order to achieve a permanent clamping action in hose clamps is to provide the clamp with some kind of resilient means. DE-A-1 No. 3130092 discloses a hose clamp the tightening band of which encloses a pressure strap and has a pleated or corrugated configuration. Owing to this configuration the tightening band assumes an elasticity in its lengthwise extension and in this manner becomes capable of compensating for the decreasing elasticity of the hose enclosed by the hose clamp.

One disadvantage inherent in the wavy or corrugated configuration of the tightening band wherein the corrugations extend towards and away from the pressure strap positioned interiorly thereof is, however, that dirt particles may enter between the ridges and dales of the corrugations and the pressure strap. When this happens the strap loses at least part of its resilient properties.

By giving the tightening band an undulating configuration it is also, however, weakened. Consequently, the band must be made thicker than what is normal in order to compensate for the weaker structure and as a result the clamp becomes more expensive to manufacture.

The purpose of the subject invention is to provide a hose clamp possessing resilient properties without the disadvantages outlined in the aforegoing. This is achieved in accordance with the teachings of the invention therein that the tightening band enclosing a pressure strap bent to annular shape and having its end portions overlapping and arranged to form a guide means to the screw worm sleeve and the tightening band between said sleeve and said band and an enclosed article, describes an arcuate line in the plane of the external face of the pressure strap along the major portion of the circumference of the latter.

Figure 4:
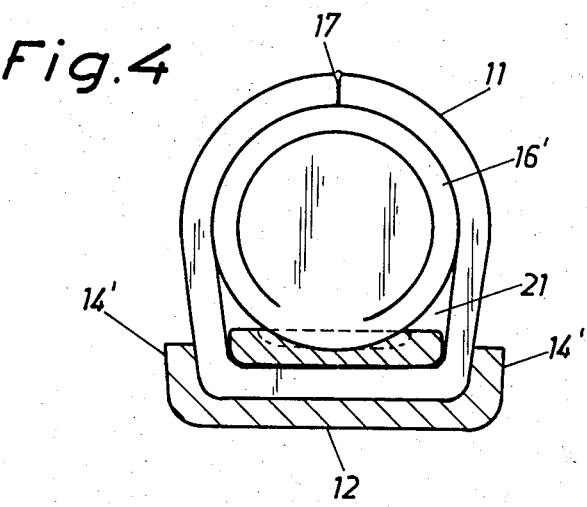

The clamp in accordance with the invention will be described in closer detail in the following with reference to the accompanying drawings, wherein FIG. 1 is a perspective view of a first embodiment of the hose clamp in accordance with the invention, FIG. 2 is a sectional view along line II—II in FIG. 1, FIG. 3 illustrates a second embodiment of the hose clamp in accordance with the invention, and FIG. 4 is a sectional view along line IV—IV in FIG. 3.

The hose clamp illustrated in FIGS. 1 and 2 consists of a pressure strap 1 bent to annular shape and having its end portions 2 and 3 positioned in overlapping relationship. The radially inner end portion 2 of the strap is provided with outwardly projecting folded edges 2' which serve to guide the radially outer strap end portion 3. Around the pressure strap 1 extends a tightening band 4 in the form of a wire bent to zigzag shape. One end portion 5 of the wire is straight, flattened and provided with transverse grooves 6. The opposite end portion 7 is helically wound into a cylindrical screw worm sleeve 8. A screw worm 9 is rotatably journalled but axially non-slidable in the sleeve 8 in which a space 10 is formed (see FIG. 2) allowing displacement of the threaded end portion 5 inside the sleeve 8 upon rotation of the screw worm 9 with the screw worm threads 9' in engagement with the grooves 6.

The wire used to form the tightening band is made from a tough-hardened material, such as piano wire, which imparts resilient properties to the zigzag-shaped portion. The pressure strap 1 preferably is made from a thin stainless steel strip.

When the hose clamp is tightened about a hose end to secure the latter to a pipe end, the pressure strap 1 will be compressed about the hose end by means of the tightening band 4 so as to assume a predetermined diameter dimension corresponding to a maximum clamping force. Upon further tightening of the screw worm 9 the bent or curved portions of the tightening band 4 will be straightened against the action of the resiliency. As the hose material slowly ages the tightening band 4, on account of its springiness, will gradually compress the pressure strap 1 as the diameter size of the hose material is being reduced. This size adjustment will continue while maintaining a clamping force which is equal to the maximum clamping force minus the existing frictional resistance in the hose clamp.

FIGS. 3 and 4 show the hose clamp in accordance with a second embodiment of the invention. In this case the screw worm sleeve 11, the pressure strap 12 and the tightening band 13 are made as one continuous unit from an elongate sheet metal strap. One free end of this continuous unit is formed by the radially inner one of the end portions 14 of the pressure strap 12. Like in the embodiment described in the aforegoing the latter is provided with outwardly directed folded edges 14' forming guide means to guide the movements of the radially outer end portion 15. The latter is attached to one end of the screw worm sleeve 11. A screw worm 16 is rotatably journalled but axially non slidable in the sleeve. The screw worm sleeve 11 consists of two flaps of the strap material which are interconnected by means of a welding seam 17 on the upper face of the sleeve. On either side of the sleeve 11 the strap material is upset inwardly by means of punch marks 18 which are arranged to engage in a manner known per se in a groove in the screw worm 16 adjacent the head 16' thereof.

The tightening strap 13 which is a zigzag shaped punching from the strap material, extends from the opposite end of the screw worm sleeve up to a straight end portion 19 which is provided with transverse grooves 20. In the latter engage the threads 16' of the screw worm 16 when the end portion 19 is positioned in the space 21 inside the screw worm sleeve 11.

Upon tightening, the hose clamp in accordance with FIGS. 3 and 4 will behave in the same manner as the hose clamp in accordance with the embodiment of FIGS. 1 and 2.

The invention is not limited to the embodiments described in the aforegoing but a number of modifications are possible within the scope of the appended claims. The screw worm sleeve 8 in accordance with the embodiment of FIGS. 1 and 2 need not be made from the wire but could be made from sheet metal in the conventional manner in the art and the wire be secured thereto. In the second embodiment the radially outer end portions 15 of the pressure strap need not be secured to the screw worm sleeve 11.

I claim:

1. An improved hose clamp comprising a tightening band bent to annular shape, end portions on said tightening band, transverse grooves provided in a first of said end portions of said tightening band, a screw worm having threads therein, said transverse grooves in said first end portion engaging in said screw worm threads, a sleeve enclosing said screw worm, said screw worm being rotatably journalled in said sleeve but axially non-slidable therein, a space in said sleeve allowing said threaded tightening band end portion to be moved out of said sleeve upon rotation of said screw worm therein, a second of said tightening band end portions opposite said first band end portion being fixed to said sleeve, a pressure strap bent to annular shape with its end portions overlapping, said tightening band being elastic in its lengthwise direction and enclosing said pressure strap, said pressure strap arranged to form a guide means to said screw worm sleeve and to said tightening band between said sleeve and said tightening band and an enclosed article, the improvement comprising said tightening band having an arcuate configuration in the plane of the external face of said pressure strap along the major portion of the circumference of said pressure strap, said arcuate configuration being adapted to resiliently deflect upon tightening of said tightening band for maintaining a substantial uniform pressure upon said pressure band during time.

2. An improved hose clamp as claimed in claim 1, wherein said tightening band is formed from a wire, the first end portion of said tightening band being flattened and provided with said transverse grooves.

3. An improved hose clamp as claimed in claim 2, comprising the second end portion of said wire band being coiled helically into the cylindrical screw worm sleeve.

4. An improved hose clamp as claimed in claim 1, characterized therein that the tightening band (13) is in the form of a steel strap punched into zigzag configuration.

* * * * *